United States Patent
Barefoot

(10) Patent No.: US 10,145,436 B2
(45) Date of Patent: Dec. 4, 2018

(54) REAR SUSPENSION HAVING AN AIR COMPONENT AND AN OIL COMPONENT

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 13 days.

(21) Appl. No.: 15/365,177

(22) Filed: Nov. 30, 2016

(65) Prior Publication Data

US 2017/0158283 A1 Jun. 8, 2017

Related U.S. Application Data

(60) Provisional application No. 62/262,962, filed on Dec. 4, 2015.

(51) Int. Cl.
| | |
|---|---|
| *F16F 9/06* | (2006.01) |
| *F16F 9/02* | (2006.01) |
| *B60G 15/12* | (2006.01) |
| *F16F 9/44* | (2006.01) |
| *B62K 25/04* | (2006.01) |
| *F16F 9/32* | (2006.01) |

(52) U.S. Cl.
CPC .............. *F16F 9/062* (2013.01); *B60G 15/12* (2013.01); *B62K 25/04* (2013.01); *F16F 9/0281* (2013.01); *F16F 9/44* (2013.01); *B60G 2202/314* (2013.01); *B60G 2300/12* (2013.01); *B62K 2025/048* (2013.01); *B62K 2201/08* (2013.01); *F16F 9/3257* (2013.01); *F16F 2228/066* (2013.01)

(58) Field of Classification Search
CPC ........ F16F 9/062; F16F 9/0281; F16F 9/3257; F16F 2228/066; B60G 15/12; B60G 2202/314; B60G 2300/12; B62K 25/04; B62K 2025/048; B62K 2201/08
USPC ...................... 188/315, 317, 319.2
See application file for complete search history.

(56) References Cited

U.S. PATENT DOCUMENTS

| | | | |
|---|---|---|---|
| 2,101,265 A | 12/1937 | Mercier | |
| 2,379,388 A * | 6/1945 | Thornhill | ............... F16F 9/3228 188/317 |
| 2,599,477 A * | 6/1952 | Patriquin | .................. F16F 9/48 137/493.8 |
| 3,888,436 A * | 6/1975 | Sealey | .................... B64C 25/60 188/284 |
| 5,788,030 A * | 8/1998 | Rottenberger | ............ F16F 9/34 188/290 |
| 6,135,434 A | 10/2000 | Marking | |

(Continued)

*Primary Examiner* — Thomas W Irvin
(74) *Attorney, Agent, or Firm* — Jason H. Foster; Kremblas & Foster

(57) ABSTRACT

The present disclosure relates to a rear shock absorber for a vehicle. The shock absorber may include a first end and a second end that slide telescopically relative to one another. A piston may be placed in fixed position relative to one of the ends. The first side of the piston may partially define a first chamber filled with a compressible fluid. The second side of the piston may partially define a second chamber filled with a substantially incompressible fluid. The substantially incompressible fluid may be under pressure and may lubricate a seal substantially surrounding a periphery of the piston.

18 Claims, 7 Drawing Sheets

(56) References Cited

U.S. PATENT DOCUMENTS

| | | | |
|---|---|---|---|
| 6,244,397 B1* | 6/2001 | Kars | F16F 9/18 |
| | | | 188/315 |
| 6,318,525 B1 | 11/2001 | Vignocchi et al. | |
| 6,491,146 B1* | 12/2002 | Yi | B62K 25/04 |
| | | | 188/319.2 |
| 7,641,028 B2 | 4/2010 | Fox | |
| 7,703,585 B2 | 4/2010 | Fox | |
| 7,878,310 B2* | 2/2011 | McAndrews | F16F 9/504 |
| | | | 188/275 |
| 8,162,112 B2* | 4/2012 | Gartner | F16F 9/49 |
| | | | 188/285 |
| 8,464,850 B2 | 6/2013 | Fox | |
| 8,480,064 B2* | 7/2013 | Talavasek | B62K 25/20 |
| | | | 267/217 |
| 8,499,905 B2* | 8/2013 | Uchiyama | B62K 25/08 |
| | | | 188/266 |
| 8,622,180 B2* | 1/2014 | Wootten | F16F 9/461 |
| | | | 188/278 |
| 8,752,681 B2 | 6/2014 | Fox | |
| 8,869,959 B2* | 10/2014 | Yablon | B60G 11/27 |
| | | | 188/319.1 |
| 8,894,050 B2* | 11/2014 | Wootten | B60G 17/048 |
| | | | 267/64.18 |
| 8,944,422 B2* | 2/2015 | Achenbach | B62K 25/04 |
| | | | 267/64.17 |
| 9,038,791 B2* | 5/2015 | Marking | B60G 13/08 |
| | | | 188/314 |
| 9,415,653 B2 | 8/2016 | Franklin | |
| 9,518,630 B2* | 12/2016 | McAndrews | F16F 9/0209 |
| 9,688,347 B2* | 6/2017 | Yablon | B62K 25/08 |
| 9,731,574 B2* | 8/2017 | Barefoot | B60G 11/27 |
| 2008/0296814 A1 | 12/2008 | Franklin | |
| 2009/0001684 A1* | 1/2009 | McAndrews | B62K 25/08 |
| | | | 280/276 |
| 2010/0276906 A1* | 11/2010 | Galasso | B60G 15/12 |
| | | | 280/283 |
| 2011/0204549 A1 | 8/2011 | Fox | |
| 2014/0239564 A1 | 8/2014 | Fox | |
| 2015/0054247 A1* | 2/2015 | Barefoot | B60G 11/27 |
| | | | 280/124.157 |
| 2015/0158547 A1 | 6/2015 | Fox | |
| 2015/0323035 A1* | 11/2015 | Coaplen | F16F 9/44 |
| | | | 188/269 |
| 2016/0363184 A1* | 12/2016 | Noguchi | F16F 9/062 |
| 2017/0100978 A1* | 4/2017 | Marking | B60G 13/06 |
| 2017/0129566 A1* | 5/2017 | Barefoot | B60G 15/12 |
| 2017/0350465 A1* | 12/2017 | Barefoot | F16F 9/368 |

* cited by examiner

REAR SUSPENSION HAVING AN AIR COMPONENT AND AN OIL COMPONENT

CROSS-REFERENCES TO RELATED APPLICATIONS

This application claims priority to U.S. Provisional Application Ser. No. 62/262,962, filed Dec. 4, 2015

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates to a rear suspension or shock absorber for a vehicle that includes a portion that includes compression of a compressible fluid and damping using a substantially incompressible fluid. In particular, the present device includes a piston that includes a compressible fluid on one side of the piston and a substantially incompressible fluid on the other side of the piston.

For many years, bicycle designers have struggled with the design of rear suspension systems. Use of air or nitrogen as the primary spring for the suspension has the benefits of reduced weight and adjustability by comparison with coil springs. The characteristics of a gas spring may be improved by providing a negative gas spring that opposes the primary, or positive, gas spring to improve initial compliance and soften re-extension ("topping out"). However, gas spring systems often suffer from friction at the dynamic seals that contain the pressure in one or more gas chambers. Designers have attempted to ameliorate this problem by spraying a small amount of lubricant, often oil, into the gas chamber on one or the other side of the piston. Such a design does not often allow for adequate lubrication, as there is no mechanical means for the lubricant to be distributed onto the surfaces in need of lubrication or to reapply the lubricant.

Accordingly, it is desirable to have a design for a rear suspension that incorporates desirable features of an air- or gas-based suspension but minimizes friction. Further, it is desirable to incorporate a lubricant that is under pressure to lubricate the dynamic pressure containment seals and dynamically sealed surfaces of the positive and negative springs. The result may be improved performance of the rear suspension to absorb and damp impact, while also allowing for on-the-fly adjustment of damping performance.

BRIEF SUMMARY OF THE INVENTION

In one embodiment, a shock absorber for a vehicle includes a first end and a second end. The first end and the second end may be capable of sliding telescopically relative to one another. The piston may be positioned in fixed relationship to one of the first end and the second end. A first chamber may be defined on a first side of the piston. An annular chamber may be defined on a second side of the piston. The first chamber may be at least substantially filled with a first fluid. The annular chamber may be at least substantially filled with a second fluid. The second fluid may be different from the first fluid.

The first fluid may be compressible. The second fluid may be substantially incompressible. The first chamber may be a compression chamber.

The shock absorber may further comprise a second chamber on the second side of the piston. The shock absorber may further include a barrier on one side of the second chamber. The barrier may be a floating barrier. The barrier may be annular.

The shock absorber may further comprise a third chamber in open fluid communication with the annular chamber. A first valve may allow substantially one-way communication of the second fluid from the second chamber to the third chamber. A second valve may govern flow of the second fluid from the third chamber to the second chamber. An adjuster may be capable of adjusting the rate of flow of the second fluid through the second valve.

A fourth chamber may be on the opposite side of the barrier from the second chamber. The fourth chamber may be at least substantially filled with a third fluid. The third fluid may be compressible. The first fluid and the third fluid may be the same. The second chamber may include a reservoir chamber. The fourth chamber may include a compensator chamber.

In another embodiment, a shock absorber for a vehicle may include a first end, a second end, a first barrier, and a second barrier. The first end and the second end may be capable of sliding telescopically relative to one another. The first and second barrier may each be positioned in spaced relationship within one of the first end and the second end. The first and second barrier may thereby at least partially define a first chamber, a second chamber, and a third chamber. An annular chamber may at least partially surround the second chamber for at least one available position of the first end and the second end. The pressure in the third chamber may decrease when the shock absorber is in a compression stroke.

The first barrier may be a piston positioned in fixed relationship to one of the first end and the second end. The first chamber may be at least substantially filled with a compressible fluid. The second chamber may be at least substantially filled with a substantially incompressible fluid. The third chamber may be at least substantially filled with a compressible fluid. The first chamber and the third chamber may be at least substantially filled with the same fluid. The second barrier may be a floating barrier. The shock absorber may further include a first valve that allows substantially one-way communication of the substantially incompressible fluid from the second chamber to the annular chamber and a second valve that governs flow of the substantially incompressible fluid from the annular chamber to the second chamber. An adjuster may be capable of adjusting the rate of flow of the substantially incompressible fluid through the second valve. The second barrier may be annular and may be configured to allow a portion of the adjuster to pass therethrough.

In another embodiment, a shock absorber may include a first end, a second end, a piston, a seal, and a first pressurized fluid. The first end and the second end may be capable of sliding telescopically relative to one another. A piston may be positioned in a fixed position relative to the second end. A seal may surround the piston and may be positioned against an interior surface of the first end. A first pressurized fluid may be within the second end. The first pressurized fluid may be capable of applying pressure against the seal and may be capable of providing lubrication between the seal and the first end.

The first pressurized fluid may be a substantially incompressible fluid. A floating barrier may be positioned within the second end and spaced from the piston. The floating barrier may divide the second end into a first portion and a second portion. The first portion may include a rebound chamber and the second portion may include a compensator chamber. The compensator chamber may be substantially filled with a compressible fluid. Pressure from the compressible fluid in the third chamber may be capable of applying pressure to the floating barrier, thereby applying pressure to the first pressurized fluid. The pressure in the compensator chamber may decrease when the shock absorber is in a compression stroke.

In another embodiment, a shock absorber for a vehicle includes a first end, a second end and a piston. The first end and the second end may be capable of sliding telescopically relative to one another. The piston may be positioned in fixed relationship to one of the first end and the second end. A first chamber may be on a first side of the piston. A second chamber may be on a second side of the piston. A third chamber may be positioned between the first chamber and the second chamber and may be configured to extend across one end of the second chamber and extend laterally along the second chamber, thereby having a U-shaped cross-section. The third chamber may be a negative spring chamber.

The third chamber may be configured to be substantially filled with a substantially incompressible fluid. The shock absorber may further include a first valve allowing substantially one-way communication of the substantially incompressible fluid from the second chamber to the third chamber and a second valve governing flow of the substantially incompressible fluid from the third chamber to the second chamber. An adjuster may be capable of adjusting the rate of flow of the substantially incompressible fluid through the second valve. The first chamber may be substantially filled with a compressible fluid.

A fourth chamber may be positioned adjacent the second chamber and spaced from the third chamber. The fourth chamber may be substantially filled with a compressible fluid. The compressible fluid in the fourth chamber may be capable of applying pressure to the substantially incompressible fluid in the second chamber.

Figure 1:
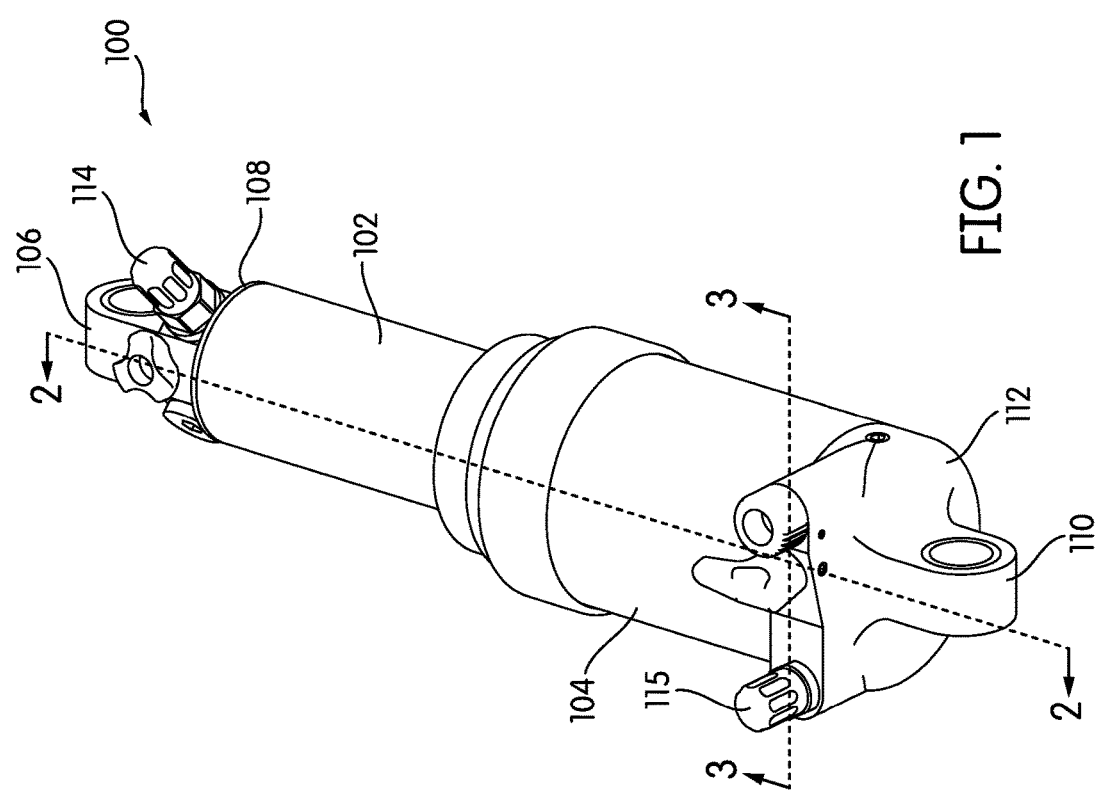
FIG. 1 is a perspective view of a shock absorber of a vehicle according to the present disclosure.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

The present disclosure relates to a suspension system for a vehicle. In particular, the suspension system may have particular application in the context of a rear shock for a bicycle. The suspension system could, however, be adapted to vehicles that are motorized or that have more than two wheels. It could also be used in other locations on a vehicle. The words "suspension" and "shock absorber" may be used interchangeably in the context of the disclosure.

The present disclosure will describe a variety of chambers within a suspension system or shock absorber system. Each chamber may be described as having a particular position and function. In the context of the disclosure and the claims, the chambers may be referred to by their function, such as a "compression chamber" or numerically, such as a "first chamber." Any of the chambers may be referred to by any of the ways of numerically describing the structure. That is, if a "first chamber" is mentioned in the specification or the claims, that first chamber could refer, in some instances to the compression chamber, and in other instances to a different chamber. In addition, there may be other features that are referred to numerically, such as a first end and a second end. A person having ordinary skill in the art will understand that these parts could be described as being numbered differently. A person having ordinary skill in the art will be able to easily understand and substitute these numerical references without undue experimentation.

Turning first to FIG. 1, a perspective view of the shock absorber 100 may be seen. The shock absorber 100 may have a first end 104 and a second end 102. Some people having ordinary skill in the art may refer to the first end 104 as a cylinder and the second end 102 as a shaft. A first eyelet 106 may be positioned at the closed end 108 of the second end 102 for attachment to one of a vehicle frame or wheel.

A second eyelet 110 may be positioned at the closed end 112 of the first end 104 of the shock absorber 100 for attachment to the other of the vehicle frame or wheel. This attachment structure and method is relatively conventional. Accordingly, the shock absorber 100 is not shown in operative position on a vehicle, but such positioning and attachment will be easily understood by a person having ordinary skill in the art.

The second end 102 may include a first valve 114 and the first end 104 may include a second valve 115, each of which may allow the introduction of a fluid into the shock absorber 100. In the context of the present disclosure, it may be desirable for each valve 114 to be a conventional Schrader valve that allows the introduction and bleed off of a compressible fluid, such as air or another gas, into a chamber in each of the second end 102 and the first end 104.

Figure 2:
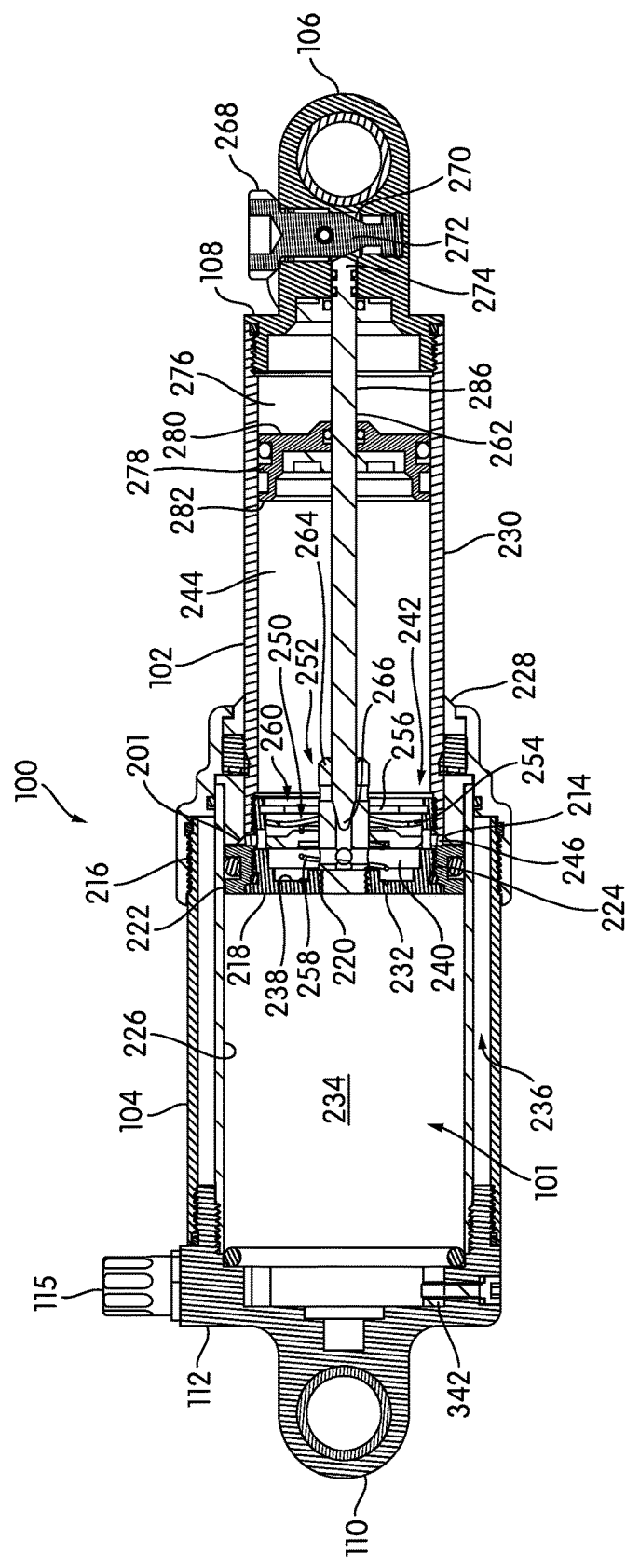
FIG. 2 is a cross-sectional view of the shock absorber of FIG. 1 taken along line 2-2.

Turning now to FIG. 2, the structure of the shock absorber 100 may be better understood. As was described above, the shock absorber 100 may include a second end 102 and a first end 104. The second end 102 and the first end 104 may be configured to slide telescopically relative to one another. The second end 102 may include the closed end 108 and an open end 214. The first end 104 may include the closed end 112 and an open end 216. The open end 214 of the second end 102 may be configured to fit within and be spaced from the open end 216 of the first end 104.

The open end 214 of the second end 102 may be at least partially closed with a piston assembly 218. The piston assembly 218 may be positioned in a fixed relationship to the second end 102. The piston assembly 218 may include a piston 220 and a seal assembly 222 that may substantially surround a circumference 224 of the piston 220 and may bridge the gap between the circumference 224 of the piston 220 and the inner surface 226 of the first end 104. The piston assembly may be considered to be a barrier between the structures in the second end 102 and the structures in the first end 104. The open end 216 of the first end 104 may be further attached to a seal assembly 228 that may bridge the gap between the first end 104 and the outer surface 230 of the second end 102.

The inner surface 226 of the first end 104, the closed end 112 of the second end, and one side 232 of the piston assembly 218 may combine to at least partially define a compression chamber 234. The compression chamber 234 may be substantially filled with a compressible fluid. The compressible fluid will typically be gas, and most typically will be air introduced under pressure through the Schrader valve 115, as is conventional.

Figure 4:
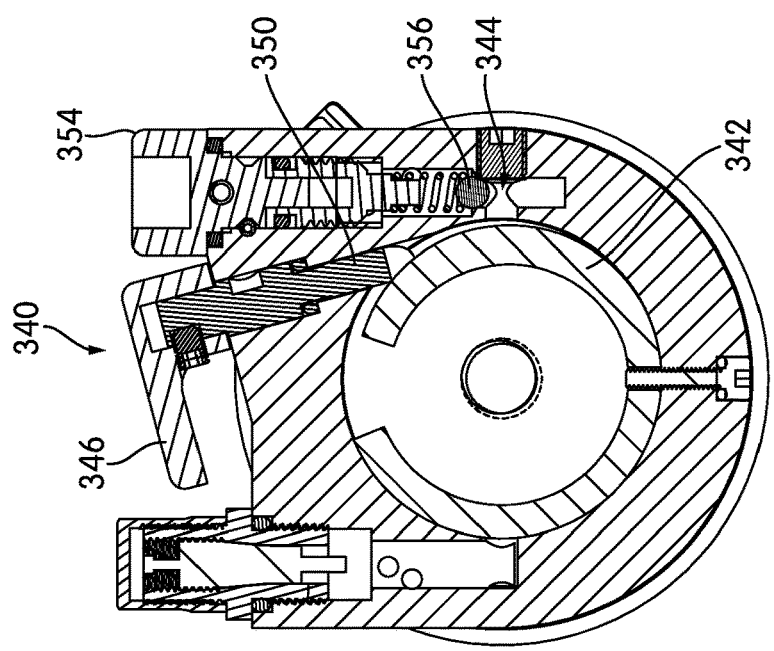
FIG. 4 is a different cross-sectional view of the shock absorber of FIG. 1 taken along line 3-3 of FIG. 1 with the compression lever in an alternative position.
Figure 3:
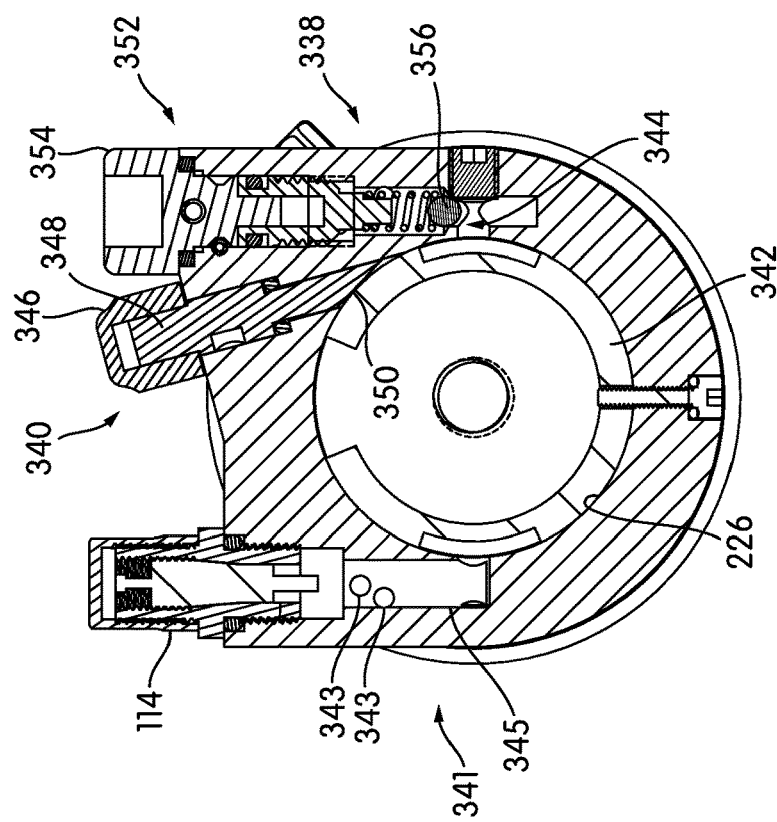
FIG. 3 is a different cross-sectional view of the shock absorber of FIG. 1 taken along line 3-3 of FIG. 1.

The details of the compression side of the shock absorber 100 may be best seen in viewing FIGS. 2-4. The volume of the compression chamber 234 and the flow of compressible fluid between the main compression chamber 234 and the supplemental compression chamber 236 may be controlled by the ramp control 338, best seen in FIGS. 3 and 4. In the configuration shown, the supplemental compression chamber 236 may be annular around the main compression chamber 234. The ramp control 338 may include two valve portions. A first valve portion 340 may include a reed valve 342 that may be configured to press outwardly against the inner surface 226 of the first end 104. When the first valve portion 340 is in the closed position, as shown in FIG. 3, the reed valve 342 may close or block the air passageway 344 between the main compression chamber 234 and the supplemental compression chamber 236. When a user wishes to open the air passageway 344 between the main compression chamber 234 and the supplemental compression chamber 236, the user can rotate the compression lever 346 to move the valve stem 348. The free end 350 of the valve stem 348 may press against the reed valve 342 and position it away from the air passageway 344, thereby allowing the compressible fluid to pass between the main compression chamber 234 and the supplemental compression chamber 236. The size of the air passageway 344 can be further adjusted with the second valve portion 352. A user may rotate the knob 354, thereby adjusting the position and/or preload on the compression adjust ball 356. This adjustment may further adjust the flow of the compressible fluid between the main chamber 234 and the supplemental chamber 236.

Figure 5:
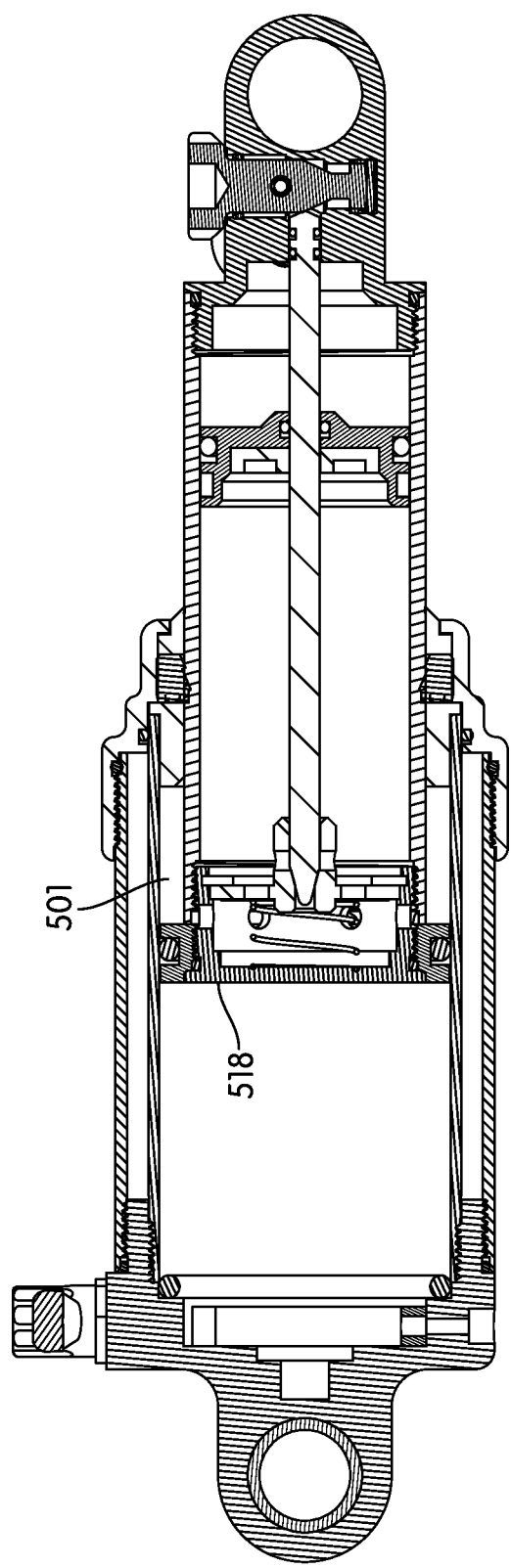
FIG. 5 is a cross-sectional view of an alternative embodiment of the shock absorber of FIG. 1 positioned during a compression stroke.

In the compression phase of the shock absorber stroke, the piston assembly 218 may move into the compression chamber 234, i.e. moving from the initial position shown in FIG. 2 to the left. FIG. 5 shows an alternative embodiment of the design with its analogous or similar piston assembly 518 in an appropriate position during a compression stroke, and the embodiment of FIG. 2 will function similarly during a compression stroke. If the first valve portion 340 is in the closed position, like that shown in FIG. 3, the movement of the piston assembly 218 may compress the compressible fluid in the main compression chamber 234. This compression may resist movement of the piston assembly 218, 518 and also assist in returning the piston assembly 218, 518 to its initial, rest position.

The resistance of the compressible fluid may be modified using the first valve portion 340 and the second valve portion 352. When the first valve portion 340 is in the open position, like that shown in FIG. 4, the effective volume of the compression chamber may include not only the volume in the main compression chamber 234, but also the volume in the supplemental compression chamber 236. Because the effective volume is increased, the compression stroke is likely to initially displace the compressible fluid between the main chamber 234 and the supplemental chamber 236. The rate of displacement will vary depending on the position of the second valve portion 352. After displacement is complete, then the movement of the piston may be resisted by the pressure from the compressible fluid. These concepts are generally known by those having ordinary skill in the art.

The first valve portion 340 may be configured to define when compressible fluid can flow primarily or only from the main chamber 234 into the supplemental chamber 236. If the first valve portion 340 is in the open position like that shown in FIG. 4, flow from the main chamber 234 to the supplemental chamber 236 may occur when the pressure of the compressible fluid within the main chamber 234 exceeds the pressure of the compressible fluid within the supplemental chamber 236. If the first valve portion 340 is in the closed position shown in FIG. 3, flow will not occur from the main chamber 234 into the supplemental chamber 236 in any reasonable circumstance (absent part failure, rupturing, etc.).

Return flow from the supplemental chamber 236 into the main chamber 234 may be governed by a third valve 341, as is best seen in FIG. 3. One or more transit holes 343 may be formed to allow compressible fluid to flow from the supplemental chamber 236 into the passageway 345 that allows the Schrader valve 114 to fill the main chamber 234 and the supplemental chamber 236. Additional transit holes (not shown in this FIG.) may be included adjacent the second valve 352. When the pressure of the compressible fluid within the supplemental chamber 236 exceeds the pressure of the compressible fluid within the main chamber 234, the compressible fluid may flow from the supplemental chamber 236, through the transit holes 343, and through the passageway 345. The fluid may then flow around the reed valve 342 and into the main chamber 234. The fluid may be able to deflect the reed valve 342 if the pressure difference is high enough. This third valve 341 may thereby allow for rapid equalization of pressures in one direction.

Returning to the view shown in FIG. 2, the structures of the chambers on the opposite side 238 of the piston assembly 218 may be seen. A rebound chamber 240 may be positioned adjacent the second side 238 of the piston assembly and may be at least partially between the compression chamber 234 and the reservoir chamber 244. A rebound valve assembly 242 may be positioned adjacent the rebound chamber 240. A reservoir chamber 244 may be positioned on the other side of the rebound valve assembly 242. The rebound valve assembly 242 may govern the flow of fluid in each direction between the rebound chamber 240 and the reservoir chamber 244. In the present design, the rebound chamber 240 and the reservoir chamber 244 may desirably be substantially filled with a substantially incompressible fluid. In many embodiments, the substantially incompressible fluid may be oil.

Figure 6:
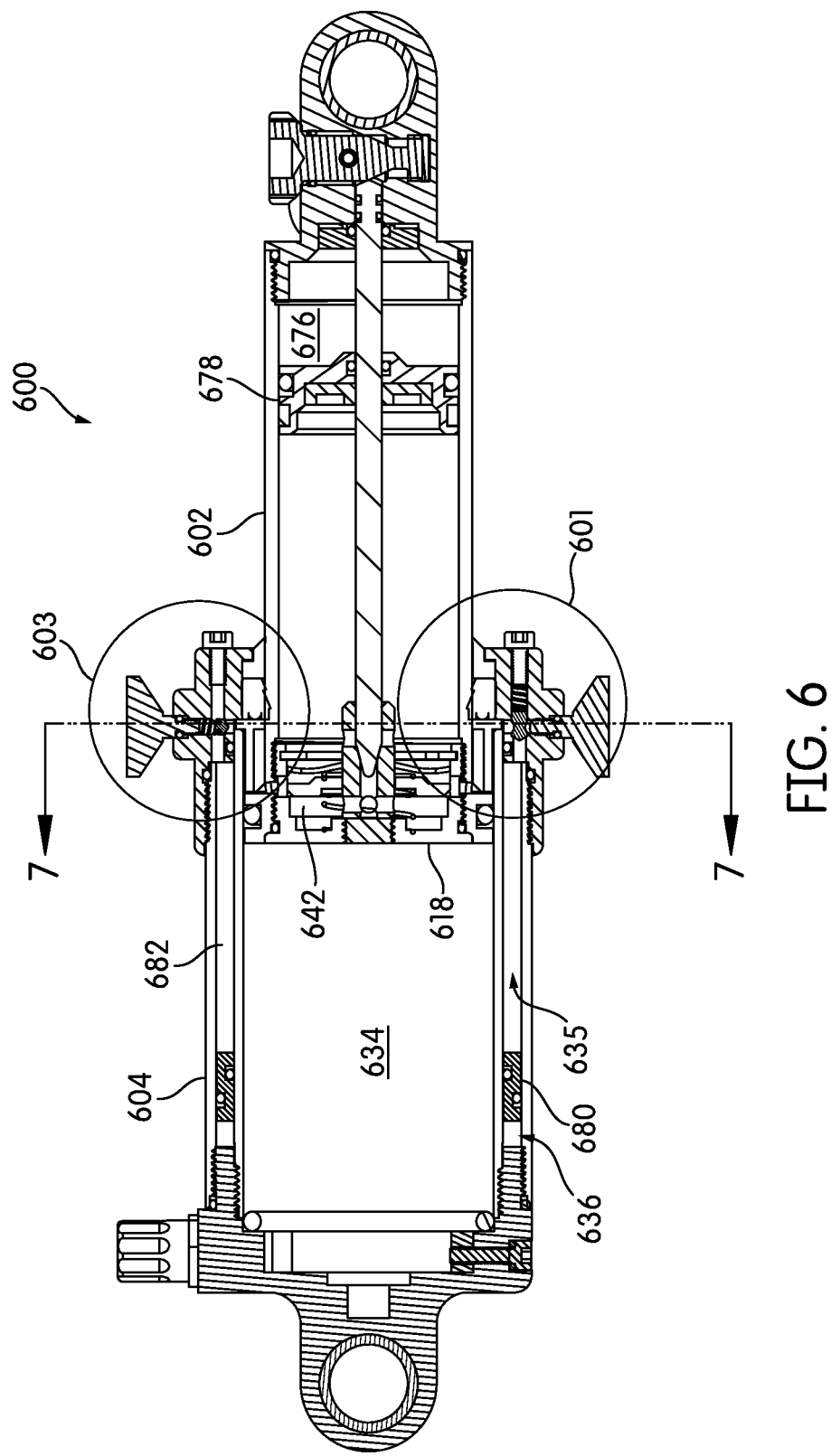
FIG. 6 is a cross-sectional view of another alternative embodiment of a shock absorber according to FIG. 1.
Figure 7:
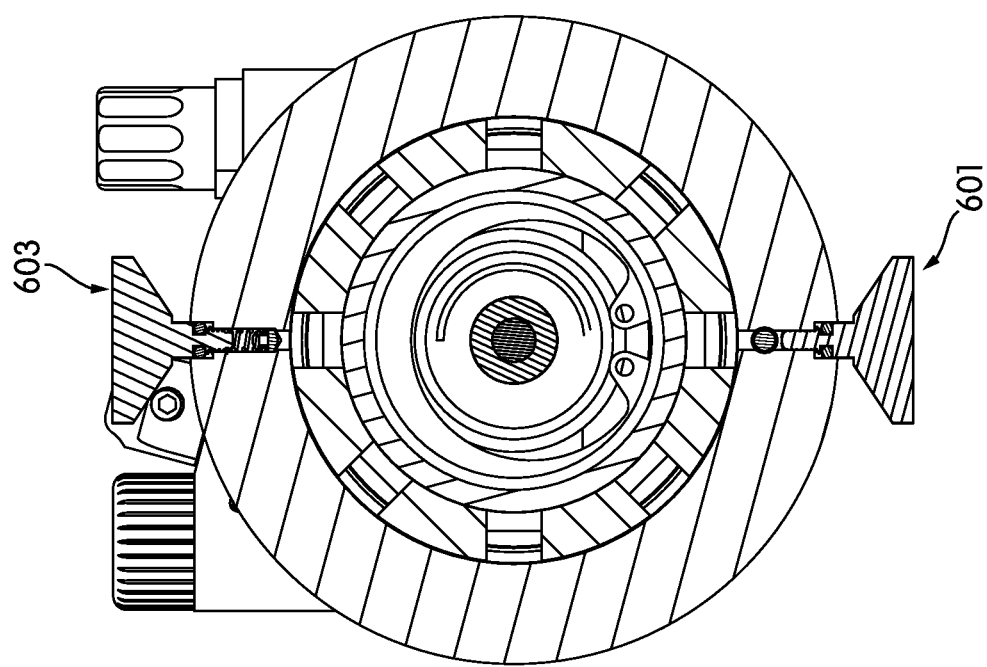
FIG. 7 is a different cross-sectional view of the embodiment of FIG. 6.
Figure 9:
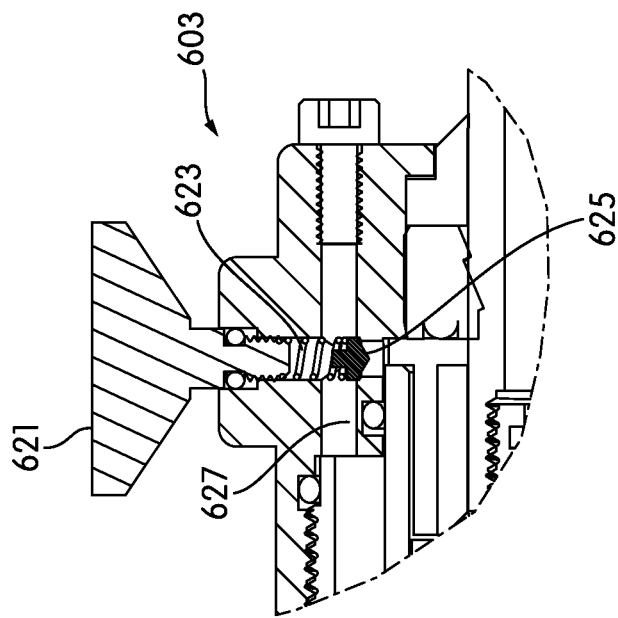
FIG. 9 is a detailed view of a different area of the embodiment of FIG. 6.

It is noted that the structures of the rebound valves shown in FIGS. 5 and 6 differ somewhat from the embodiment shown in FIG. 2. These alternative structures could be used instead of those shown in FIG. 2. A person having ordinary skill in the art will be able to select the precise configuration of these rebound valves that may be desirable in a particular configuration to achieve the desired results without undue experimentation.

The rebound valve assembly 242 may include a first rebound valve portion 250 and a second rebound valve portion 252. The first rebound valve portion 250 may govern flow of the substantially incompressible fluid from the reservoir chamber 244 to the rebound chamber 240. The second rebound valve portion 252 may govern flow of the substantially incompressible fluid from the rebound chamber 240 to the reservoir chamber 244. In the embodiment shown, the first rebound valve portion 250 may include a washer 254 pressed against a substrate 256 by a spring 258. When the force of the substantially incompressible fluid in the reservoir chamber 244 exceeds the force applied to the washer 254 from fluid pressure within the rebound chamber 240 and the force of the spring 258 (plus any other relevant forces), the washer 254 may move away from the substrate 256, thereby opening a passageway 260 allowing fluid to flow between the rebound chamber 240 and the reservoir chamber 244. In many embodiments, the spring constant of the spring 258 may be selected so that the fluid flow through the first rebound valve portion 250 is substantially one-way only from the reservoir chamber 244 to the rebound chamber 240.

Flow from the rebound chamber 240 to the reservoir chamber 244 may be governed by the second rebound valve portion 252. The second rebound valve portion 252 may include an elongated pin 262 placed within a passageway 264 between the rebound chamber 240 and the reservoir chamber 244. The elongated pin 262 may have a tapered end 266. The position of the tapered end 266 may be adjusted using a knob 268 that may be manipulated by a user to modify the rebound damping. The position of the tapered end 266 within the passageway 264 may control the rate of fluid flow from the rebound chamber 240 to the reservoir chamber 244 at a given pressure.

In the compression phase of the shock absorber stroke, the piston assembly 218 may move into the compression chamber 234, i.e. from the initial position shown in FIG. 2 to the left. As previously described, FIG. 5 shows an alternative embodiment of the design with its piston assembly 518 during a compression stroke, and the embodiment of FIG. 5 will function similarly during a compression stroke. When the compression stroke starts, the piston assembly 218 may move towards the left. This movement may increase the size of the rebound chamber 240, as there is a passageway 246 that allows the substantially incompressible fluid in the rebound chamber 240 to pass into an annular chamber created between the outer surface 230 of the second end 102 and the inner surface 226 of the first end 104. This annular chamber is identified as 501 in FIG. 5. In the embodiment of FIG. 2, there remains a very small portion of this annular chamber 201 available to fluid in the rest position. As may be noted in a comparison of the FIGS. and the embodiments shown therein, the rebound chamber 240 and the annular chamber 201, 501 are configured to allow free fluid flow therebetween. Accordingly, the rebound chamber 240 and the annular chamber 201, 501 may be considered to be two separate chambers or may be considered to be a single chamber. In many embodiments, as shown in FIG. 5, the annular chamber 501 may at least partially surround the reservoir chamber 244 for at least one available reciprocating position of the second end 102 and the first end 104.

When the compression stroke begins, pressure may be applied to the substantially incompressible fluid through a structure and method that will be described in greater detail below. In addition, an additional fluid force may be created through the opening of the annular chamber 201, 501. These forces may combine to overcome the forces of the spring 258 and the fluid force in the rebound chamber 240, thereby opening the passage 260. This allows the substantially incompressible fluid to flow from the reservoir chamber 244 into the rebound chamber 240 and the annular chamber 201, 501. In this way, pressure of the fluid in the compensator chamber 276 may cause the rebound chamber 240 to also function as a negative spring chamber in combination with the annular chamber 201, 501. Accordingly, the negative spring chamber formed includes a portion that extends across one side 238 of the piston 220 and annularly around the outside surface 230 of the second end 102. This combined chamber has a substantially U-shaped configuration.

When the shock absorber 100 has reached the end of its compression stroke, the piston assembly 218 may return to its initial position as shown in FIG. 2. As the piston assembly 218 moves to the right (in the orientation shown in FIG. 2), the size of the negative annular chamber 201, 501, may decrease and return to the size shown at 201 in FIG. 2. As this annular chamber decreases in size, the substantially incompressible fluid may be forced through the passageway 264 and past the elongated pin 262. The position of the tapered end 266 of the elongated pin 262 may control the effective size of the opening within the passageway 264 through which the substantially incompressible fluid may flow. The adjustment of this pin 262 may thereby control how the piston assembly 218 returns to its rest position.

As noted above, the position of the tapered end 266 of the elongated pin 262 may be adjusted by a user. A user may rotate an adjuster, for example a knob 268 at the closed end 108 of the second end 102. When the user rotates the knob 268, a stem 270 attached to the knob 268 may change position. This change of position may change the location at which an end 274 of the pin 262 may contact a sloped area 272 of the stem 270. The force of the substantially incompressible fluid against the pin 262 may move it to the appropriate location against the stem 270.

In many embodiments, the substantially incompressible fluid may be a lubricant. The use of a substantially incompressible fluid in the rebound chamber 240 and the annular chamber 201, 501 may allow for the lubrication of the piston seal 222 and the main seal 228. When the substantially incompressible fluid enters the annular chamber 201, 501, it may come into contact with the inner surface 226 of the first end 104 and the outer surface 230 of the second end 102. At least some residue of the lubricating fluid may remain on that inner surface 226 and that outer surface 230 during the rebound stroke. Accordingly, a lubricant is able to be distributed over the respective surfaces on which the piston seal 222 and the main seal 228 slide, thereby reducing friction. This lubricating feature is enhanced due to the fact that the substantially incompressible fluid is under pressure.

The pressure on the substantially incompressible fluid in the rebound chamber 240, the annular chamber 201, 501, and the reservoir chamber 244 may be applied using a compensator chamber 276. The compensator chamber 276 may, in many embodiments, be filled with a compressible fluid. The compressible fluid will typically be gas, and most typically will be air introduced under pressure through the Schrader valve 114, as is conventional. The compensator chamber 276 may be separated from the reservoir chamber 244 by a floating barrier 278. The floating barrier 278 may function as a piston in some embodiments.

When the shock absorber 100 enters the compression stroke and the piston assembly 218 moves into the compression chamber 234, substantially incompressible fluid may move from the reservoir chamber 244 into the rebound chamber 240 and the annular chamber 201, 501. This fluid movement may reduce the fluid pressure within the reservoir chamber 244. Because the compensator chamber 276 is substantially filled with a compressible fluid, the compressible fluid may press against a first side 280 of the floating barrier 278, thereby moving it towards the piston assembly 218 and continuing to apply pressure or force to the substantially incompressible fluid in the reservoir chamber 244. Particularly during the compression stroke, this pressure from the compressible fluid in the compensator chamber 276 may pressurize the substantially incompressible fluid in the reservoir chamber 244, the rebound chamber 240, and the annular chamber 201, 501. This pressure may also cause pressurized fluid to apply fluid pressure against the piston seal 222. When the shock absorber 100 enters its rebound stroke and the piston assembly 218 moves back towards its initial position, the substantially incompressible fluid may apply force or pressure against the opposite side 282 of the floating barrier 278 and return it to its rest position as shown in FIG. 2. Accordingly, during the compression stroke, the volume in the compensator chamber 276 may increase, and the pressure in the compensator chamber 276 may decrease. Similarly, during the rebound stroke, the volume in the compensator chamber 276 may decrease and the pressure in the compensator chamber 276 may increase.

As may be seen in FIG. 2, the floating barrier 278 may be annular. The floating barrier 278 may be configured to allow a portion of the rebound valve assembly 242 to pass through the floating barrier 278. In some embodiments, the elongated pin 262 may pass through a central opening 286 in the floating barrier 278.

The shock absorber 100 may be considered to include a body or housing, which may include the entire profile of the second end 102 and the first end 104 together. The interior cavity 101 of the shock absorber 100 may be divided into a number of portions. The piston 220 or piston assembly 218 may be considered to divide the interior cavity into a first chamber, like the compression chamber 234 and the second chamber, like the combined rebound chamber 240, reservoir chamber 244, annular chamber 201, 501, and compensator chamber 276. The floating barrier 278 may be considered to divide the second chamber into a first portion, like the combined rebound chamber 240, reservoir chamber 244, and annular chamber 201, 501, and a second portion, like the compensator chamber 276. Alternatively, the first and second portions of the second chamber could be considered a second chamber and a third chamber. The annular chamber 201, 501 could also be considered a separate, fourth chamber. As can be seen, varying combinations of chambers can be combined and described in a variety of meaningful ways.

The structures separating the varying chambers may also be referred to in a variety of ways. The valves and series of valves may be considered to be barriers between different chambers, in addition to performing a valve function. The pistons and other barriers may function as both pistons and barriers or only as a piston or a barrier, depending on the needs of the designer. In many embodiments, it is desirable for the valves, pistons, and barriers to all be spaced from one another within the interior cavity of the shock absorber, to allow chambers to be formed at least partially therebetween.

An alternative configuration is shown in FIGS. 6-9. In the configuration of FIGS. 6-9, all the features present in the embodiments of FIGS. 1-5 are present. Accordingly, these features are not described in detail again in connection with this embodiment. If the description of a feature from a previous embodiment is abbreviated or absent, a person having ordinary skill in the art will understand that the feature is identical or substantially similar to the corresponding feature in the embodiments of FIGS. 1-5. The embodiment of FIGS. 6-9 adds a flow path that allows the substantially incompressible fluid to flow into and out of a second or supplemental annular chamber or space within the supplemental compression chamber, thereby allowing a user further control over the compression and damping features of the shock absorber.

The shock absorber 600 may include a first end 602 and a second end 604 that telescopically slide in relation to one another. A piston assembly 618 may at least partially close the first end 602 and may separate the shock absorber 600 into a plurality of chambers. A first chamber may be a compression chamber 634, which may be on one side of the piston assembly 634. The compression chamber 634 may be substantially filled with a compressible fluid, which may be pressurized air. The compression chamber 634 may selectively be in fluid communication with a supplemental compression chamber 636. Rather than the supplemental compression chamber 636 substantially extending annularly the full length of the second end 604, an annular floating barrier or piston 680 may be positioned within the annular chamber 635 that surrounds the compression chamber 634. The annular floating barrier 680 in the annular chamber 635 may divide the annular chamber into a first chamber, which is the supplemental compression chamber 636, and a second chamber, which is a supplemental annular chamber 682. The flow of substantially incompressible fluid between the supplemental annular chamber 682 and the rebound chamber 642 may be governed by the supplemental compression valve 601, as is shown in detail in FIG. 8, and the supplemental rebound valve 603, as is shown in detail in FIG. 9.

Figure 8:
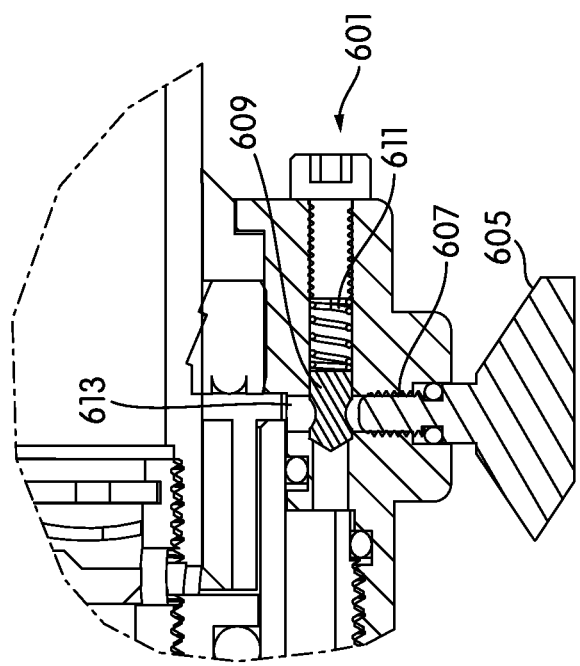
FIG. 8 is a detailed view of one aspect of the view of FIG. 6.

Turning now to FIG. 8, the supplemental compression valve 601 may be configured to be a substantially one-way valve that allows the substantially incompressible fluid to flow primarily or only from the supplemental annular chamber 682 to the rebound chamber 642. A first exterior knob 605 may be rotated to create interference between a first stem 607 and a first sprung blocker 609, which may be biased into a closed position by a first spring 611. When the first knob 605 is in a deactivated position, such as that shown in FIG. 8, when the fluid pressure in the supplemental annular chamber 682 exceeds the spring force from the spring 611, along with any other forces that would affect that force, the fluid pressure in the supplemental annular chamber 682 may displace the first sprung blocker 609 and allow substantially incompressible fluid to flow out of the supplemental annular chamber 682, through the first passageway 613, and into the rebound chamber 642. When the knob 605 is in its actuated position, the first stem 607 may be positioned relative to the first blocker 609 in a manner to restrict or prevent the first blocker 609 from moving and allowing fluid flow. If the first knob 605 is actuated in that manner, compression resistance may be increased.

The supplemental rebound valve 603 may be configured to be a substantially one-way valve that may allow the substantially incompressible fluid to flow from the rebound chamber 642 to the supplemental annular chamber 682. A second exterior knob 621 may be rotated to change the effective preload or spring force of an attached second spring 623 against a second sprung blocker 625. When the fluid pressure in the rebound chamber 642 exceeds the spring force from the second spring 623, along with any other forces that would affect that force, the fluid pressure in the rebound chamber 642 may displace the second sprung blocker 625 and allow substantially incompressible fluid to flow out of the rebound chamber 642, through the second passageway 627, and into the supplemental annular chamber 682. The greater the force applied by the spring 623, the slower the rebound of the shock absorber.

Adjusting the initial positions of the annular floating piston 680 and the floating piston 678 may also affect the compression and rebound characteristics of the shock absorber 600. In addition, a user may vary the characteristics of the shock absorber 600 by adjusting the pressure of the compressible fluid introduced into the compression chamber 634 and the compensator chamber 676. The interrelationships of these features and the first valve 601 and the second valve 603 are generally known to a person having ordinary skill in the art. A designer, and a user, can easily manipulate these settings as they wish to create an appropriate or desired feel.

It is noted that in the present design, only one fixed piston assembly 218 may be used. All features of the oil-based rebound damping may be positioned laterally between the fixed piston assembly 218 and the eyelet end 106 of the second end 102. The disclosed embodiments thereby do not require the use of a second piston in fixed relationship to the first end and positioned within the second end. The removal of that piston and shaft may allow for greater ease of assembly and control of damping.

Another way of saying this is that the piston assembly 218 may be configured to displace a volume in the compression chamber relative to its entire surface area during the compression stroke. When the first end 104 and second end 102 move with respect to each, the change in volume of the compression chamber 234 is defined by the equation V=S (d/2)^2*pi. In this equation, V=volume displaced; S=the distance the piston assembly 218 moves; d=the diameter of the piston assembly 218 (or, substantially equivalently, the inner diameter of the first end 104). In many prior art devices, where a shaft is positioned within the equivalent of the first end, the volume displaced would be less, because the shaft occupies volume within the chamber.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:
1. A shock absorber for a vehicle, comprising:
a first end; and
a second end;
wherein the first end and the second end are capable of sliding telescopically relative to one another;
a piston positioned in fixed relationship to one of the first end and the second end;
a first chamber defined on a first side of the piston; and
an annular chamber defined on a second side of the piston;
wherein the first chamber is at least substantially filled with a first fluid; and
wherein the annular chamber is at least substantially filled with a second fluid different from the first fluid;
a second chamber on the second side of the piston;
a floating annular barrier on one side of the second chamber, the barrier including a central aperture; and
a third chamber in open fluid communication with the annular chamber.

2. The shock absorber according to claim 1, wherein the first fluid is compressible.

3. The shock absorber according to claim 1, wherein the second fluid is substantially incompressible.

4. The shock absorber according to claim 1, wherein the first chamber is a compression chamber.

5. The shock absorber according to claim 1, further comprising a first valve allowing substantially one-way communication of the second fluid from the second chamber to the third chamber and a second valve governing flow of the second fluid from the third chamber to the second chamber.

6. The shock absorber according to claim 5, further comprising an adjuster capable of adjusting the rate of flow of the second fluid through the second valve.

7. The shock absorber according to claim 5, wherein the third fluid is compressible.

8. The shock absorber according to claim 5, wherein the first fluid and the third fluid are the same.

9. The shock absorber according to claim 1, further comprising a fourth chamber on the opposite side of the barrier from the second chamber.

10. The shock absorber according to claim 1, wherein the fourth chamber is at least substantially filled with a third fluid.

11. A shock absorber for a vehicle, comprising:
a first end; and
a second end;
wherein the first end and the second end are capable of sliding telescopically relative to one another;
a first barrier and a second barrier each positioned within one of the first end and the second end in spaced relationship, thereby at least partially defining a first chamber, a second chamber at least substantially filled with a substantially incompressible fluid, and a third chamber;

an annular chamber at least partially surrounding the second chamber for at least one available relative position of the first end and the second end;

a first valve allowing substantially one-way communication of the substantially incompressible fluid from the second chamber to the annular chamber and a second valve governing flow of the substantially incompressible fluid from the annular chamber to the second chamber; and an adjuster capable of adjusting the rate of flow of the substantially incompressible fluid through the second valve;

wherein the second barrier is annular and is configured to allow a portion of the adjuster to pass therethrough; and wherein when the shock absorber is in a compression stroke, the pressure in the third chamber decreases.

12. The shock absorber according to claim 11, wherein the first barrier is a piston positioned in fixed relationship to one of the first end and the second end.

13. The shock absorber according to claim 11, wherein the first chamber is at least substantially filled with a compressible fluid.

14. The shock absorber according to claim 11, wherein the third chamber is at least substantially filled with a compressible fluid.

15. The shock absorber according to claim 11, wherein the first chamber and the third chamber are at least substantially filled with the same fluid.

16. The shock absorber according to claim 11, wherein the second barrier is a floating barrier.

17. A shock absorber for a vehicle, comprising:
a first end and a second end capable of sliding telescopically relative to one another;
a piston positioned in a fixed position relative to the second end;
a seal surrounding the piston and positioned against an interior surface of the first end;
a first pressurized fluid within the second end, the first pressurized fluid capable of applying fluid pressure against the seal and capable of providing lubrication between the seal and at least one portion of the first end; and
a floating barrier within the second end spaced from the piston and dividing the second end into a first portion and a second portion;
wherein the second portion is substantially filled with a compressible fluid;
wherein pressure from the compressible fluid in the second portion is capable of applying pressure to the floating barrier, thereby applying pressure to the first pressurized fluid; and
wherein the pressure in the second portion decreases when the shock absorber is in a compression stroke.

18. The shock absorber according to claim 17, wherein the first pressurized fluid is a substantially incompressible fluid.

* * * * *